US005385689A

United States Patent [19]
Tom et al.

[11] Patent Number: 5,385,689
[45] Date of Patent: Jan. 31, 1995

[54] PROCESS AND COMPOSITION FOR PURIFYING SEMICONDUCTOR PROCESS GASES TO REMOVE LEWIS ACID AND OXIDANT IMPURITIES THEREFROM

[75] Inventors: Glenn M. Tom, New Milford; James V. McManus, Danbury, both of Conn.

[73] Assignee: Novapure Corporation, Danbury, Conn.

[21] Appl. No.: 84,414

[22] Filed: Jun. 29, 1993

[51] Int. Cl.$^6$ ............................................. C09K 3/00
[52] U.S. Cl. ............................ 252/194; 252/181.4; 252/188.28; 423/210.5; 427/432; 502/2; 502/3; 502/400; 502/402; 502/414; 502/415
[58] Field of Search ............. 423/210.5; 427/432; 502/2, 3, 400, 414, 402, 415; 252/194, 181.4, 188.28

[56] References Cited

U.S. PATENT DOCUMENTS

| | | | |
|---|---|---|---|
| 4,603,148 | 7/1986 | Tom | 521/31 |
| 4,604,270 | 8/1986 | Tom | 423/262 |
| 4,659,552 | 4/1987 | Tom | 423/219 |
| 4,761,395 | 8/1988 | Tom | 503/401 |
| 4,781,900 | 11/1988 | Tom et al. | 423/210 |
| 4,797,227 | 1/1989 | Tom et al. | 252/194 |
| 4,800,189 | 1/1989 | Eschwey et al. | 502/400 |
| 4,853,148 | 8/1989 | Tom et al. | 252/194 |
| 4,865,822 | 9/1989 | Tom et al. | 423/210 |
| 4,925,646 | 5/1990 | Tom et al. | 423/488 |
| 4,950,419 | 8/1990 | Tom et al. | 252/194 |
| 4,983,363 | 1/1991 | Tom et al. | 422/180 |
| 5,015,411 | 5/1991 | Tom et al. | 252/194 |

FOREIGN PATENT DOCUMENTS 365490 4/1990 European Pat. Off. .

OTHER PUBLICATIONS

CRC Handbook of Chemistry and Physics, 65th Edition, CRC Press. Boca Raton, Fla., pp. D155–159 (1984).
"Characterizing a Resin–Based Purifier Using APIMS and Various Sources of Argon," Microcontamination, Jan. 1992, pp. 23–28.
"Gas Purification and Measurement at the PPT Level," J. Electrochem. Soc., vol. 138 (12), pp. 3717–3723 (1991).

Primary Examiner—Richard D. Lovering
Assistant Examiner—Valerie Fee
Attorney, Agent, or Firm—Steven J. Hultquist

[57] ABSTRACT

Scavenger compositions useful for purifying process gas streams, such as process gas streams, such as hydrogen, nitrogen, noble gases, diborane, and hydride gases from Groups IVA–VIA of the Periodic Table, such as arsine, phosphine, silane, germane, hydrogen selenide, and hydrogen telluride, and mixtures thereof, to remove water, oxygen, and other oxidant and Lewis acid impurities therefrom, such scavenger comprising a porous, high surface area inert support having thereon an active scavenging species, formed by the deposition on the support of a Group IA metal and pyrolysis thereof at a selected elevated temperature on said support. In another aspect, the present invention relates to a method of making a scavenger useful for purifying process gas streams, to remove water, oxygen, and other oxidant and Lewis acid impurities therefrom, and a process for purifying process gas streams to remove water, oxygen, and other oxidant and Lewis acid impurities therefrom, such process comprising contacting the impurity-containing process gas stream with a scavenger of the general type described above. In a further aspect, the invention relates to a method for using scavengers of the general type described above as back-diffusion scrubbers to protect the manufacturing process or gas supply system from inadvertent introduction of impurities, such method comprising contacting the impurity-containing process gas stream with a scavenger of the general type described above and providing in the scavenger bed one or more endpoint detectors so that back-diffusion events are observed.

15 Claims, 3 Drawing Sheets

PROCESS AND COMPOSITION FOR PURIFYING SEMICONDUCTOR PROCESS GASES TO REMOVE LEWIS ACID AND OXIDANT IMPURITIES THEREFROM

BACKGROUND OF THE INVENTION

1. Field of the Invention

The present invention relates to a composition and method for removing water, oxygen, and other oxidant and Lewis acid impurities from a flowing gas stream. The purification method does not contaminate the gas stream with added hydrocarbon impurities.

2. Description of the Related Art

The provision of high purity gas streams is critically important in a wide variety of industrial and research applications. The rapid expansion of vapor-phase processing techniques, e.g., chemical vapor deposition, in the semiconductor industry has been associated with the deployment and use of manufacturing equipment that is totally reliant on the delivery of ultra-high purity process gases at the point of use in the semiconductor manufacturing facility. Currently, over 5 billion dollars worth of such equipment is in use.

Considering the impurities which are present in gas streams involved in semiconductor manufacturing, it is to be noted that the growth of high quality thin film electronic and opto-electronic cells by chemical vapor deposition or other vapor-based techniques is inhibited by a variety of low-level process impurities. These impurities can cause defects that reduce yields by increasing the number of rejects, which can be very expensive. These impurities may be particulate or chemical contaminants. Particulates are typically filtered out of the gas stream using extremely efficient commercially available particle filters, with particle filtration generally being employed at the point of use.

Chemical impurities may originate in the production of the source gas itself, as well as in its subsequent packaging, shipment, storage, and handling. Although source gas manufacturers typically provide analyses of source gas materials delivered to the semiconductor manufacturing facility, the purity of such gases may change because of leakage into or outgassing of the containers, e.g., gas cylinders, in which the gases are packaged. Impurity contamination may also result from improper gas cylinder changes, leaks into downstream processing equipment, or outgassing of such downstream equipment.

Chemical impurities that are of special concern in semiconductor manufacturing processes include water, oxygen, and other oxidant and Lewis acid species such as aluminum, boron or zinc-containing species. In general, the key chemical impurities must be held at levels of a few parts per billion or lower.

In support of the requirement for high purity process gases, a number of types of gas purifiers have been introduced that remove chemical contaminants from the semiconductor process gases at the point of use. These gas purifiers employ a variety of sorption processes to remove impurities, including physisorption processes, e.g. gas adsorption by zeolites or activated carbon, or various chemisorption processes, where the impurities adsorb to and chemically react with a component or components of the purifier.

Particularly useful in-line purifiers are based on passive sorption processes, wherein the impurity species are adsorbed and chemically reacted with scavengers bound to or incorporated in porous inert support materials. Such purifiers are described in U.S. Pat. Nos. 4,603,148, 4,604,270, 4,659,552, 4,800,189. Because of their usefulness in purifying semiconductor process gas streams, where the requirements for purity are stringent, such purifiers have been the subject of much research and development activity, as well as significant commercial success. U.S. Pat. Nos. 4,761,395 (composition for purification of arsine, phosphine, ammonia and inert gases); 4,853,148 (hydrogen halide purification); 4,797,227 (hydrogen selenide purification); 4,781,900 (method of purifying arsine, phosphine, ammonia and inert gases); 4,950,419 (inert gas purification); 4,685,822 (hydrogen selenide purification); 4,925,646 (hydrogen halide purification method); 4,983,363 (apparatus for purifying arsine, phosphine, ammonia and inert gases); and 5,015,411 (inert gas purification method) describe this type of purifier and their disclosures are hereby incorporated herein. This class of purifiers is quite versatile, since the immobilized scavenger species may be varied and tailored to react with a large number of different impurities. Because the support material is usually porous, contact of the scavenger with the gas stream is extensive. Such gas purifiers are used to remove Lewis acid and oxidant impurity species, particularly water and oxygen, which have deleterious effects on the semiconductor manufacturing process. By varying the chemical identity of the scavenger, they may also be used to remove undesirable dopant species from the gas stream. Such gas purifiers can be very simple in design and operation, since purification occurs passively, simply by contact of the process gas stream with the scavenger As described in applicant's copending U.S. patent application Ser. No. 07/898,840, the disclosure of which is hereby incorporated herein, these purifiers can also be used advantageously in the back-diffusion scrubber mode. The purifier is outfitted with one or more endpoint detectors, and is positioned to purify the process gas stream before its entrance into the process tool, and also serves as an impurity scrubber that protects the gas supply against contamination caused by diffusion of one or more foreign components back into the supply lines. Back-diffusion can occur when mechanical components such as check valves and shut-off valves fail. Additionally, in low flow conditions, impurities can successfully diffuse against the convective forward flow. An example of a situation where back-diffusion is of concern is the case where an inert gas such as nitrogen is used to pressurize vessels containing liquids used in semiconductor manufacturing processes. Such liquids include sulfuric acid, isopropanol, acetone and the like, which can cause corrosion and contamination of the nitrogen supply system by back-diffusion under low flow conditions.

When the purifier is used for a back-diffusion scrubber, endpoint detection is critical. Back-diffusion is not planned for, and therefore it is impossible to predictively calculate the purifier's lifetime on the basis of flowrates, expected impurity concentrations, and so forth. Endpoint detection allows the immediate detection of a serious back-diffusion event, and the appropriate precautions to protect the gas supply may be mobilized. Use of two endpoint detectors disposed at separate points in the gas purifier's scavenger bed allows back-diffusion to be distinguished from normal exhaustion of the purifier. If the downstream endpoint detector signals purifier depletion before the upstream one does, back-diffusion can be diagnosed in a straightforward and simple way.

While the gas purifiers of the types described above are very effective at removing impurities from the process gas streams to very low levels, the scavengers may contribute low levels of hydrocarbon impurity to the gas streams being purified. U.S. Pat. Nos. 4,604,270 and 4,603,148 to G. M. Tom disclose scavengers in which alkyl metal compounds are immobilized by coupling them to an organic polymeric support, followed by pyrolysis to yield a dispersed phase of the metal hydride in the organic polymer matrix. For example, dried, porous styrene-divinylbenzene copolymer (PSDVB) beads are mixed with butyllithium and heated for a prolonged period in an oven to immobilize butyllithium species on the resin and largely convert the butyllithium to lithium hydride which is immobilized in the porous polymer beads. Such scavengers can contribute the butane elimination reaction by-product to gas streams being purified. Other purifiers that have alkylmetal-based scavengers or scavengers prepared from alkylmetal starting materials may manifest this same behavior.

Hydrocarbon impurities, even at very low levels, are highly undesirable in semiconductor process gas streams. In chemical vapor deposition processes, the high temperatures or plasmas in the reactor can cause decomposition of the hydrocarbon impurity and incorporation of carbon in the growing film. Carbon, a Group IVA element, is a dopant in compound semiconductors of the III-VI type.

Process gas purifiers based on other sorption principles such as metal eutectic alloy getters are sometimes employed, and these purifiers avoid the hydrocarbon impurity problem. For example, European Patent Application EP 470,936 describes removal of impurities from hydride gases by passing the hydride gas over a hydrogenated getter metal in a chamber. In particular, disiloxane may be removed from silane using hydrogenated Zr-V-Fe getter alloy. Gases which may be purified in this fashion include $SiH_4$, $GeH_4$, $NH_3$, $AsH_3$, $SbH_3$ and $PH_3$, all of which are used in semiconductor manufacturing. European Patent Application EP 365,490 describes a method for removing impurity gases from inert gases such as argon or nitrogen using a first sorbent of either a non-evaporable getter alloy of Zr-V-Fe or Zr-Fe and a second sorbent of a non-evaporable getter alloy of 5-50% Al, balance Zr. Both sorbents are pellets formed from alloy powder of average particle size below 125 microns, with the first sorbent being located at the gas inlet and the second at the gas outlet.

These metal eutectic alloy getters, while avoiding the problem of hydrocarbon contribution to the process gas stream, are not the simple, elegant systems that the passive sorption-based purifiers described earlier are. The getters must be operated at high temperatures, in the range of 300° C. to 500° C. At lower temperatures, e.g. about 25° C., the scavenging capacities of the getters are low. Because the gases being purified can be highly flammable, e.g., silane or hydrogen, and because of the added complexity and expense involved in their use, the metal eutectic alloy getters are not the most desirable solution to the problem. Impurity reduction using the getters has been shown to be less efficient than competing sorption-based purifier technology.

The presence of even small concentrations of impurity species in the process gas streams employed in semiconductor manufacturing is potentially deleterious. Even small levels of impurities on the order of parts per million (ppm) can cause inconsistent electrical properties in semiconductor devices manufactured by deposition techniques using impurity-containing gas streams.

It therefore is an object of the present invention to provide a simple, rapid, and versatile purification system able to provide a high level of purification efficiency, with regard to removal of water, oxygen, and other oxidant and Lewis acid impurities, such as is required to protect semiconductor manufacturing processes.

It is a further object of the present invention to provide an improved scavenger characterized by high scavenging capacity with regard to removal of water, oxygen, and other oxidant and Lewis acid impurities, and that avoids previous problems of hydrocarbon contamination.

It is still another object of the invention to provide a method of making the aforementioned scavengers, and a process and apparatus for using the same to purify process gas streams, to remove water, oxygen, and other oxidant and Lewis acid impurities therefrom. Such scavengers and purifier systems can also be used in a back-diffusion scrubber mode to protect the integrity of the manufacturing process or gas supply system.

SUMMARY OF THE INVENTION

The present invention relates in one aspect to a scavenger composition useful for purifying process gas streams, such as hydrogen, nitrogen, noble gases (helium, neon, argon, krypton, and xenon), diborane, and hydride gases from Groups IVA-VIA of the Periodic Table, such as arsine, phosphine, silane, germane, hydrogen selenide, and hydrogen telluride, and mixtures thereof, to remove oxidants and Lewis acid impurities, particularly water and oxygen, therefrom, such scavenger comprising:

(a) an inert support having a surface area in the range of from about 50 to about
1000 square meters per gram (as measured by the conventional BET surface area determination), and thermally stable up to at least about 250° C.; and (b) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof at a selected elevated temperature on said support.

In another aspect, the present invention relates to a method of making a scavenger useful for purifying process gas streams, to remove oxidants and Lewis acid impurities, particularly water and oxygen, therefrom, such method comprising:

(a) providing a support having a surface area in the range of from about 50 to about 1000 square meters per gram, and thermally stable up to at least about 250° C.;

(b) depositing on such support, at a concentration from about 0.01 to about 1.0 moles per liter of support, a Group IA metal selected from the group consisting of sodium, potassium, rubidium and cesium; and (c) pyrolyzing the metal on the support, at a temperature of from about 125° C. to about 225° C., under a blanketing atmosphere of an inert gas such as argon, nitrogen, or helium, with intermittent or continuous mixing, to distribute the alkali metal throughout the porous support.

A further aspect of the invention relates to a process for purifying gas streams to remove oxidants and Lewis acid impurities, particularly water and oxygen, therefrom, such process comprising contacting the impurity-containing process gas stream with a scavenger of the general type described above.

In a further aspect, the invention relates to a method for using scavengers of the general type described above as back-diffusion scrubbers to protect the manufacturing process or gas supply system from inadvertent introduction of impurities, such method comprising contacting the impurity-containing process gas stream with a scavenger of the general type described above and providing in the scavenger bed one or more endpoint detectors so that back-diffusion events are observed.

DETAILED DESCRIPTION OF THE INVENTION

The present invention overcomes the deficiencies of the prior art sorption-based process gas purification systems, as described in the "Background of the Invention" section hereof by the provision of a non-hydrocarbon-releasing gas purification system which is specifically adaptable for use in the manufacture of semiconductor devices including vapor deposition based processes.

In semiconductor manufacturing operations, water vapor and oxygen are regarded as the critical impurities, whose presence often indicates atmospheric contamination of the process system. Accordingly, the invention will be illustratively described hereinafter primarily with reference to removal of water or oxygen as the impurity species of interest. It will be recognized, however, that such focus is for descriptive purposes only and that the invention is broadly practicable in scavenging other impurity species that are oxidants or Lewis acids, since these materials all react rapidly and avidly with the scavengers of the present invention.

First, the gas purification system must itself be non-contaminating in character, with respect to the gas stream being processed. Since the flowing gas stream after its purification is flowed to the deposition reactor or other locus of use, any contaminants deriving from the scavenger will subsequently be distributed throughout the process system. Any contributed impurities may have a deleterious effect on the products being manufactured. Accordingly, any impurities introduced from the purification system itself should be suitably low, e.g., in the parts per billion range or lower.

The gas purification system must be mechanically tight and leak-free in character. This requirement dictates the use of correspondingly suitable materials of construction in the purification system, with the parts and components of the detector system having a high finish on those parts and components which are in contact with the gas stream, and with all seals of the purifier being of a face seal, leak-tight character.

Preferred materials of construction for the purifier housing, connections and valving are stainless steel, glass, or chemically resistant epoxies. If any particulates are generated in the use and operation of the purifier, particle filters may be required components of the system. This requirement is readily met in actual practice, since most commercially available gas purifiers incorporate a particle filter as an integral part of the design. Any endpoint detector sensing unit incorporated in the purifier design should be positioned upstream of the particle filter.

The scavenger must react rapidly and essentially irreversibly with the impurities of interest. The scavenger should incorporate a highly reactive species immobilized on a porous support medium, so that the contact time of the gas with the reactive species will be sufficient for adequate purification to occur.

Further, the scavenger system should be chemically stable when stored for substantial periods of time, e.g., at least six months, and preferably on the order of one year or more, without the scavenger becoming degraded and losing its high reactivity with impurities.

Additionally, the cost of the process gas purification system should be suitably low to ensure ready commercial deployment, with economic, readily available gas purifier devices being utilizable in present and foreseeable semiconductor processing systems.

The foregoing criteria are accommodated in the broad practice of the present invention by the provision of a gas purification system in which the flowing process gas stream is passed over a scavenger material that is highly reactive with the impurity or impurities of interest, and that reacts with the impurities to form involatile products that are held within the porous support medium and not released into the purified process gas stream.

The present invention relates in one aspect to a scavenger composition useful for purifying process gas streams comprising hydrogen, nitrogen, noble gases (helium, neon, argon, krypton, and xenon), and hydride gases (tabulated below), or mixtures thereof, to remove oxidants and Lewis acid impurities, particularly water and oxygen, therefrom, such scavenger comprising:

(a) an inert support having a surface area in the range of from about 50 to about 1000 square meters per gram, and thermally stable up to at least about 250° C.; and (b) an active scavenging species, present on the support at concentration ranging from about 0.01 to about 1.0 moles per liter of support, preferably 0.01–0.25 moles per liter of support, and formed by the deposition on the support of a Group IA metal and pyrolysis thereof at a selected elevated temperature on said support.

Hydride gases that can be purified using the scavenger of the present invention include the following, tabulated according to Periodic Group of the nonhydrogen element:

| Group IIIA | Group IVA | Group VA | Group VIA |
|---|---|---|---|
| $B_2H_6$ diborane | $CH_4$ methane | $NH_3$ ammonia | |
| | $SiH_4$ silane | $PH_3$ phosphine | $H_2S$ hydrogen sulfide |
| | $GeH_4$ germane | $AsH_3$ arsine | $H_2Se$ hydrogen selenide |
| | $SnH_4$ stannane | $SbH_3$ stibine | $H_2Te$ hydrogen telluride |

Properties of metals that are useful as the active scavenging species are shown below (from R. C. West, Ed., CRC *Handbook of Chemistry and Physics*, 65th Ed., CRC Press, Inc., Boca Raton, Fla., pp. D155–D159, 1984):

| Metal | Melting Point (°C.) | Vapor Pressure (atm) | E (V) | Forms Passive Oxide | Reactivity with Inert Gases |
|---|---|---|---|---|---|
| Na | 97.8 | $3 \times 10^{-14}$ | −2.71 | No | None |
| K | 63.7 | $2 \times 10^{-11}$ | −2.93 | No | None |
| Rb | 38.9 | $3 \times 10^{-10}$ | −2.98 | No | None |
| Cs | 28.7 | $3 \times 10^{-9}$ | −2.92 | No | None |

The metal for the active scavenging species can be chosen from the Group IA metals, or mixtures or alloys of the same. Na, K, Rb, and Cs or mixtures or alloys of the same are preferred, with K most preferred. These metals are soft, have low vapor pressure, are extremely sensitive to $O_2$ and $H_2O$, and are readily and inexpensively available. Note, however, that lithium will react with nitrogen and may be unsatisfactory for service in this gas stream, and in addition, lithium has a much higher melting point (180.5° C.) and therefore could not be vapor-deposited on the resin beads as conveniently as Na, K, Rb, and Cs. A further consideration is the effect that any trace of the scavenging metal would have on the semiconductor process.

The support medium must be inert in the intended application, where "inert" means that the support is non-reactive with the Lewis acid and oxidant impurities which are reactively removed by the active scavenging species present on the support, and that the support is also non-reactive with the gases being purified by the scavenger. The support must be compatible with the gas mixtures being purified, and the reaction products of the impurity removal, and any intermediates involved with conditioning or otherwise preparing the scavenger, and must be stable under the conditions of use.

The preferred characteristics of supports which are useful for scavengers of the invention include (a) high surface area, for example, a surface area in the range of from about 50 to about 1000 square meters per gram of support (as measured by the conventional BET surface area determination), (b) high porosity from pores of a diameter in the range of from about 3 to about 200 Ångstroms, and (c) good thermal stability, e.g., thermally stable at temperatures up to about 250° C.

Illustrative support materials which may be potentially useful in the broad practice of the invention include macroreticulate polymers, such as those formed from monomers such as styrene, vinyltoluene, vinylisopropylbenzene, ethylvinylbenzene, vinylnaphthalene, alpha-methylstyrene, beta-methylstyrene, and mixtures thereof. Such polymers may suitably be polymerized in the presence of a cross-linking agent such as divinylbenzene or divinylnaphthalene.

A particularly preferred macroreticulate polymer is poly(styrenedivinylbenzene), commercially available as Amberlite XAD4 (50 Ångstrom pore size) and Amberlite XAD2 (100 Ångstrom pore size), from Rohm and Haas Corp., Philadelphia, Pa.

In general, the scavengers of the present invention are prepared by a process comprising:
  (a) providing a support having a surface area in the range of from about 50 to about 1000 square meters per gram, and thermally stable up to at least about 250° C.;
  (b) depositing on such support, at a concentration from about 0.01 to about 1.0 moles per liter of support, preferably 0.01–0.25 moles per liter of support, a Group IA metal selected from the group consisting of sodium, potassium, rubidium and cesium and mixtures and alloys of the same; and
  (c) pyrolyzing the metal on the support, at a temperature of from about 125° C. to about 225° C., under a blanketing atmosphere of an inert gas such as argon, nitrogen, or helium, with intermittent or continuous mixing, to distribute the alkali metal throughout the porous support.

The support is selected as described above and is provided in a reactor vessel in a dry state, which can be obtained by heating the support in a dry atmosphere. The addition of the metal for preparing the active scavenging species is carried out in an inert atmosphere such as in an inert atmosphere glove box or the like. The metal used for preparing the active scavenging species, selected as described above, is added to the support in a liquid or solid state. The reactor vessel is then protected from contact with oxygen or moisture in the atmosphere by sealing or some other method, and heated to a temperature sufficient to melt the metal and disperse it throughout the pores of the support. The reactor vessel may be periodically or continuously agitated during this heating step to facilitate dispersion of the metal. The heating step may be carried out initially at a lower temperature, i.e. on the order of about 100° C., to melt the metal, and then after the molten metal has been dispersed throughout the porous support, the temperature may be increased to a higher level, i.e., on the order of 200°–230° C., and held there for several hours, to immobilize the metal on the porous support. When the heating step is complete, a color change is generally observed, indicating a strong interaction of the metal with the porous support medium.

It should be noted that, by contrast with the methods for preparing prior art scavengers for passive sorption based gas purification, such as those described in the Related Art section, e.g. U.S. Pat. Nos. 4,603,148, 4,761,395, and 4,950,419, the method of the present invention does not require solvents such as benzene or toluene. This advantage, possible because the scavenger is loaded onto the inert support medium as a molten metal rather than as a solution of an organometallic precursor compound, provides cost and environmental benefits. Solvents such as benzene and toluene require careful control to prevent exposure to personnel, and solvent wastes must be disposed of through regulated, sometimes costly, means.

The scavengers of the invention may be readily formed into a bed through which the impurity-containing gas stream is flowed for purification thereof, thereby providing a highly efficient removal system for water, oxygen, and other oxidant and Lewis acid impurities from process gas streams, such as hydrogen, nitrogen, noble gases, diborane, and hydride gases from Groups IVA–VIA of the Periodic Table, such as arsine, phosphine, silane, germane, hydrogen selenide, and hydrogen telluride, or mixtures thereof. The capacities of the scavengers for water removal can range from about 0.2 to about 20 liters gaseous water per liter of a bed of said scavenger, with the corresponding oxygen removal capacities being approximately equal to the values for water removal capacities.

The scavenging capacity depends upon the loading of the Group IA metal on the porous support. In use with hydride gases, scavengers of the invention may, upon initial contact with the gas being purified, undergo exothermic "preconditioning" reactions to form active scavenging species. Thus it should be appreciated that in service with inert gases, high capacity and hence high loading may be desirable, whereas with hydride gases, because the initial preconditioning reaction of the hydride gas with the scavenger is exothermic, a lower loading may be preferred.

The process gas stream purification can take place at the point at which the gas is loaded into cylinders for delivery or at a central point in the process plant where the gas is used ("bulk purification"). Alternatively, the scavenger may be incorporated into a smaller-scale unit and purification may take place immediately before the gas stream enters the process tool, i.e., the chemical vapor deposition reactor, reagent pressurization unit, or other gas-requiring process unit. Because of the simplicity of the passive sorption-based purification provided by the scavengers of the present invention, such "in-line purification" is easily facilitated, in contrast to prior art, non-hydrocarbon contaminating methods such as the metal eutectic getters described above in the "Related Art" section, which must be heated to a high temperature to be effective scavengers.

In a further aspect, the invention relates to a method for using scavengers of the general type described above as back-diffusion scrubbers to protect the manufacturing process or gas supply system from inadvertent introduction of impurities, such method comprising contacting the impurity-containing process gas stream with a scavenger of the general type described above and providing in the scavenger bed one or more endpoint detectors so that back-diffusion events are observed. The endpoint detectors signal the occurrence of a major back-diffusion event through coupling to alarms or lights that notify personnel that the purifier has been exhausted and needs to be replaced. The purifier essentially serves as an impurity scrubber that protects the gas supply against contamination caused by diffusion of one or more foreign components back into the supply lines. Back-diffusion can occur when mechanical components such as check valves and shut-off valves fail. Additionally, in low flow conditions, impurities can successfully diffuse against the convective forward flow. An example of a situation where back-diffusion is of concern is the case where an inert gas such as nitrogen is used to pressurize vessels containing liquids used in semiconductor manufacturing processes. Such liquids include sulfuric acid, isopropanol, acetone and the like, which can cause corrosion and contamination of the nitrogen supply system by back-diffusion under low flow conditions.

When the purifier is used for a back-diffusion scrubber, endpoint detection is critical. Back-diffusion is not planned for, and therefore it is impossible to predictively calculate the purifier's lifetime on the basis of flowrates, expected impurity concentrations, and so forth. Endpoint detection allows the immediate detection of a serious back-diffusion event, and the appropriate precautions to protect the gas supply may be mobilized. Use of two endpoint detectors disposed at separate points in the gas purifier's scavenger bed allows back-diffusion to be distinguished from normal exhaustion of the purifier. If the downstream endpoint detector signals purifier depletion before the upstream one does, back-diffusion can be diagnosed in a straightforward and simple way.

Figure 1:
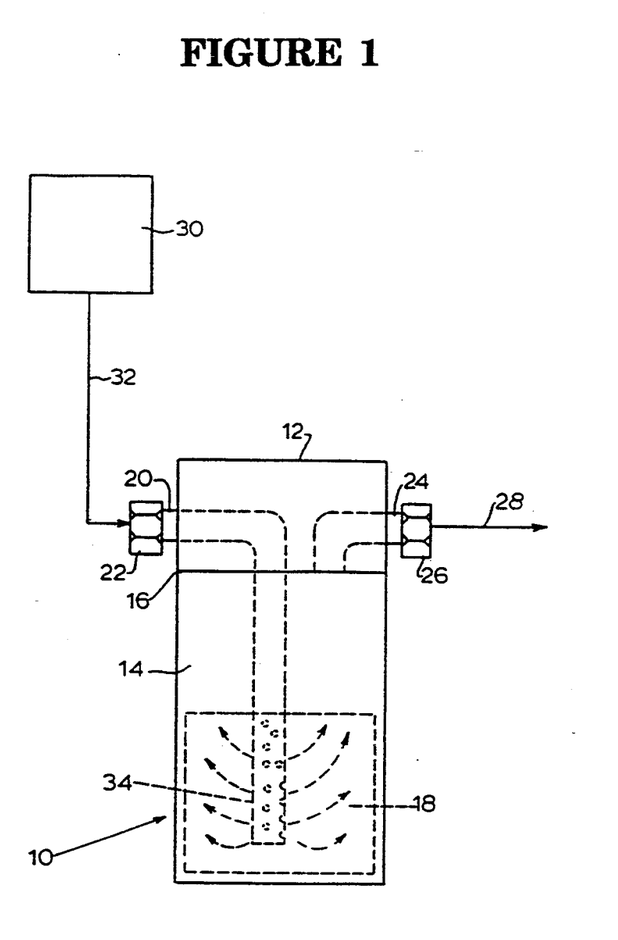
FIG. 1 shows a schematic representation of an apparatus for carrying out the gas purification method of the invention.

FIG. 1 shows a schematic representation of an apparatus for carrying out the gas purification method of the invention. The vessel 10 comprises an upper cylindrically shaped block 12 joined to the cup-like receptacle 14 by means of circumferentially extending weld 16. In the lower portion of receptacle 14 is disposed a bed 18 of the scavenger according to the present invention.

The vessel features means for introducing the impurity-containing gas mixture, comprising one or more gases from the group hydrogen, nitrogen, noble gases, diborane, and hydride gases from Groups IVA–VIA of the Periodic Table, such as arsine, phosphine, silane, germane, hydrogen selenide, and hydrogen telluride, into the interior space of the receptacle 14 for contact with the scavenger in bed 18. Such introduction means comprise the conduit 20, provided at its exterior end with an appropriate fitting 22 for joining with the supply line 32 to inert gas mixture source 30. The conduit 20 passes through the block 12 as shown, in a generally horizontal direction toward the center of the block and then downwardly extending from the block into the bed 18. At its lower portion in contact with the bed, this conduit has a plurality of gas distribution openings 34, through which the gas mixture flows outwardly and upwardly through the scavenger in the bed.

Above the bed in the receptacle 14, the impurity-depleted gas flows into the outlet conduit 24, provided with a suitable fitting 26 for connection to the product gas discharge line 28, from which the purified gas may be supplied to a downstream end-use processing facility.

Figure 2:
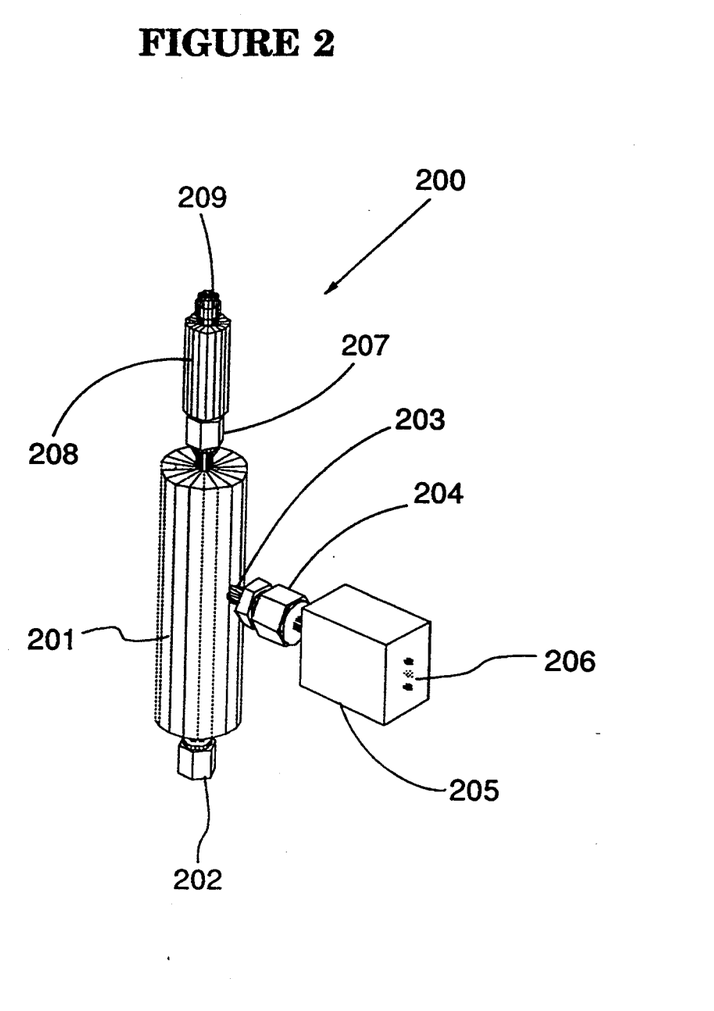
FIG. 2 shows a schematic representation of an inline gas purifier for carrying out the gas purification method of the invention, outfitted with an endpoint detector connected through a sensor port constructed in the body of the purifier, and which may be used for back-diffusion scrubbing.

FIG. 2 shows two perspective views of a purification system 200, comprising an endpoint detector connected through a sensor port 203 constructed in the body of an inline gas purifier 201 connected to a downstream particle filter 208. The gas flow stream to be purified enters the purifier through the inlet 202. The sensor port 203 is constructed in the purifier body, presenting the sensor element to the gas flow stream. The detector feedthroughs pass through the sensor port 203 and are connected via a fitting 204 to the detector control module 205, which provides LED display 206. The gas flow stream continues through the connection fitting 207, passing through particle filter 208 and finally exiting through outlet 209. The purifier configured as shown in FIG. 2 is useful as a back diffusion scrubber, able to protect both purge lines from potential contaminant backstreaming and to purify the gas stream used in the downstream process. The provision of the in-situ sensor allows back diffusion events to be detected, and thus the need for purifier changeout or the system problems can be noted and addressed promptly.

In semiconductor manufacturing, many of the gases used are toxic or flammable, and all must be of exceptionally high purity. Therefore, in the practice of the present invention, all connections and fittings must be of high integrity and non-contaminating, such as VCR or Swagelok fittings.

Other gas flow streams in which the gas purifier of the present invention can provide analogous service include nitrogen flow streams used to pressurize liquid reagents and solvents for delivery into semiconductor processes and the various types of chemical vapor deposition processes that not only require extremely high gas purity but also use gases such as arsine, silane or phosphine that are toxic and/or flammable.

The features and advantages of the present invention are further shown with respect to the following non-limiting examples.

EXAMPLE 1

Preparation of Cesium-PSDVB Scavenger

Inside an inert atmosphere glove box, about 100 ml of Amberlite XAD4 (previously dried by calcining at 200° C.) was placed into a long-necked, 250 ml glass round bottle-type reaction vessel having a 3 mm inner diameter constriction near the top of its neck. The dried Amberlite XAD4 beads were cream-white in color. About 2 g cesium metal was melted into the vessel. The vessel was sealed with a serum vial top. The reaction mixture was a two-phase mixture of the polymer beads and the metallic cesium. The sealed vessel was brought out of the glove box. About 100 ml/minute of dry nitrogen was flowed into the vessel through a needle inserted through the serum vial top above the constriction. The nitrogen was not passed through the bed of polymer beads. The bottom of the vessel was heated to about 200° C. in an oil bath for a total of about 19 hours. The vessel was agitated periodically, by gently swirling approximately once every hour. After about five minutes of heating, the appearance of the reaction mixture changed from the initial cream-white polymer bead/grey metal two-phase appearance to the appearance of polymer beads being coated with a grey metallic film. After about two hours of heating, the mixture began to change to a purple-red color, becoming a uniform mass of deeply purple-colored beads. The reaction vessel was cooled to room temperature and the vessel was sealed by melting the glass at the constriction.

EXAMPLE 2

Preparation of Potassium-PSDVB Scavenger 1

250 ml of Amberlite XAD4 (previously dried by calcining at 200° C.) was added to a clean 1-liter single-ended Hoke TM sample cylinder inside an inert atmosphere glove box. 2.5 g liquid (100° C.) potassium was added to the cylinder, which was then sealed with a Nupro ® BW-series bellows valve. Between the sample cylinder and the Nupro valve was placed a 0–60 psig pressure gauge. The sample cylinder was then removed from the glove box, placed in an oven, and heated to 100° C. for 50 minutes. The cylinder was shaken several times to disperse the molten potassium. After 50 minutes, the oven temperature was slowly raised to 220° C., by raising the temperature in 20° C. increments and then holding temperature constant for 30 minutes at each new temperature. The cylinder was shaken for about one minute with every temperature increase, again in order to disperse the potassium. The oven was then held at 220° C. for 15 hours. The cylinder was then allowed to cool to room temperature and then was transferred into an inert atmosphere glove box. The resulting K/Amberlite material was then poured from the cylinder through a funnel into a 500 ml Wheaton media bottle. The K/Amberlite material was uniformly dark brown, free-flowing beads with a bulk density of 0.3 g/ml.

EXAMPLE 3

Preparation of Potassium-PSDVB Scavenger 2

Liquid potassium (100° C., 0.25 g) was transferred from a 50 g potassium ampoule (Strem Chemical) to a 75 ml single-ended stainless steel sample cylinder (Hoke) which contained 50 ml of Amberlite XAD4 previously dried by calcining at 200° C. for 15 hours. The sample cylinder was held at 210° C. for 15 hours. Periodically the sample cylinder was shaken to disperse the molten potassium. The final product was free-flowing, reddish-brown Amberlite-like beads.

EXAMPLE 4

Preparation of Sodium/Potassium Alloy-PSDVB Scavenger

Amberlite XAD4 (25 ml, previously dried by calcining at 200° C. for 24 hours) was added to a clean 50 ml alumina crucible inside an inert atmosphere glove box. Sodium-potassium alloy (0.25 g, Na/K mass ratio 1:6) was added to the crucible, which was then heated to 200° C. using a muffle furnace with the glove box. Periodically the mixture was stirred to distribute the Na/K. After an hour of heating at 200° C., the Amberlite color changed from its initial cream color to a dark brownish red. The crucible and its contents were then allowed to cool to room temperature. Still in the inert atmosphere glove box, the flee-flowing, brownish-red reaction product was poured into a 125 ml glass Wheaton media bottle. Upon close visual inspection, some small residual Na/K droplets were present in the product, probably as a consequence of insufficient heating time. When removed from the glove box and exposed to room air, the Na/K/Amberlite scavenger reacted to yield off-white spherical beads.

EXAMPLE 5

Reaction of Potassium-PSDVB Scavenger 1 with 1000 ppm Water

The K/Amberlite scavenger material prepared in Example 2 was allowed to react with a 1000 ppm gaseous $H_2O$ (balance helium) stream, in order to measure the amount of free potassium or other $H_2$-producing species. Any free K would react to produce gaseous $H_2$ by the reaction:

$$K + H_2O \rightarrow KOH + \tfrac{1}{2} H_2$$

The $H_2$ should then elute from the scavenger bed with minimal chromatographic retention because of its low boiling point. Thus, measurement and integration of the gas phase $H_2$ concentration in the effluent gas stream should yield a reasonably quantitative estimate of the free K content of the scavenger beads.

100 standard cubic centimeters per minute (sccm) of helium was bubbled through a 100 ml serum vial containing 20 ml of deionized water. The temperature and pressure of the serum vial bubbler were measured, and, assuming that the helium gas stream became saturated with water vapor, the gas phase water concentration was calculated to be 1000 parts per million (ppm). The resulting $H_2O$-laden helium was then passed over a bed of 10 g K/Amberlite Scavenger 1 at a rate of 100 sccm. The $H_2$ in the effluent gas stream was quantified using a Gow-Mac 590 gas chromatograph with discharge ionization detector, under the following chromatographic conditions:

| | |
|---|---|
| Column: | 6 foot × ⅛ inch 5A Molecular Sieve in series with a 20 foot × ⅛ inch Porapak Q.S. precolumn |
| Carrier flow rate: | 30 ml/minute helium |
| Analysis temperature: | 80° C. isothermal |
| Detector temperature: | 100° C. |
| Detector flow: | 10 sccm |
| Detector range: | $10^{-11}$, attenuation 1 |

This chromatographic method could detect CO, $O_2$, and $CH_4$ in addition to $H_2$. No CO, $O_2$, or $CH_4$ were detected in the course of the experiment, with a detection limit of 50 parts per billion (ppb).

The $H_2$ concentration in the effluent gas stream approached a constant level of about 10 ppm and stayed at that level for about 2 hours, suggesting that the hydrogen-producing sites were uniformly distributed throughout the bed of scavenger beads, in agreement with the visual observation that the bed was very uniform in color. Free, metallic potassium reacts with water to give hydrogen and potassium hydroxide, by the reaction shown above. Thus, if the potassium present in the bed were in the free, metallic form, the concentration of hydrogen in this plateau phase would have been expected to be about 500 ppm, half of the original 1000 ppm. Based on the amount of $H_2$ released by the bed at a plateau level of about 10 ppm, the free potassium in the scavenger bed was calculated to be about 2% of the potassium that was originally added to the Amberlite in the preparation of the scavenger bed. It must be concluded that the remainder of the potassium present in the scavenger bed was in a chemical form other than free, metallic potassium, in agreement with the observation that a color change occurred upon heating the potassium/Amberlite mixture. The bulk of the oxygen scavenging capacity of the bed was not accounted for by free potassium, and thus most of the scavenger sites comprise the chemically reacted potassium.

EXAMPLE 6

Analysis of $C_2$–$C_5$ Hydrocarbon Emissions from Potassium-PSDVB Scavenger 1

The K/Amberlite scavenger prepared in Example 2 was tested to determine if it released hydrocarbons during purging with helium. Analysis was carried out by gas chromatography using a discharge ionization detector. The limit of detection for $C_1$ to $C_4$ hydrocarbons was about 10 parts per billion (ppb). The instrument was calibrated for the range of zero to 1000 ppb $C_2$–$C_4$ n-alkanes using a calibration standard gas prepared by serial dilution of a 1 part per million certified standard gas mixture using mass flow controllers to effect dilution. The accuracy of this dilution method is ±5%. The gas chromatographic conditions were:

| | |
|---|---|
| Column: | 6 foot × ⅛ inch Hayesep Q |
| Carrier gas flow: | 30 ml per minute helium |
| Analysis temperature: | Isothermal at 125° C. |
| Detector temperature: | 100° C. |
| Detector range: | $10^{-11}$, attenuation 1 |
| Run time: | 15 minutes |
| Order of elution: | $C_1$ 0.93 minutes, $C_2$ 1.54 minutes, $C_3$ 3.6 minutes, $C_4$ 9.6 minutes |

The $C_1$–$C_4$ hydrocarbon emissions were studied at three stages:

1. Freshly prepared K/Amberlite (10 ml) which had never been purged, as obtained directly from the reaction vessel, was placed in a tube and helium was passed through the material at a flow rate of 250 sccm for two minutes to pick up any residual hydrocarbons.

2. K/Amberlite during continuous purging with helium at 250 sccm.

3. Depressurization of a vessel containing the K/Amberlite sample after a 24-hour hold at elevated pressure, 100 psig.

The results of the analysis showed:

1. Freshly prepared K/Amberlite that had never been purged, as obtained directly from the reaction vessel, off-gassed methane, ethane, propane, butane and butene at low levels. $C_1$–$C_4$ hydrocarbons were detected at levels of 500 to 1000 parts per billion for a period of about thirty minutes.

2. After the K/Amberlite sample (10 ml) was purged with helium for one hour at a flow rate of 250 sccm, the $C_1$–$C_4$ hydrocarbons that had initially been detected declined to levels below the detection limit of the discharge ionization detector (i.e., less than 10 ppb each).

3. In order to determine whether any of the $C_1$–$C_4$ hydrocarbons that were detected in the initial purge were regenerated or desorbed upon standing, the same 10 ml sample of K/Amberlite analyzed in steps 1 and 2 above was pressurized to 100 psig with helium and then valved off and held at room temperature for 24 hours. After the 24 hour hold, the gas in the sample tube was analyzed by the discharge ionization detector. No $C_1$–$C_4$ hydrocarbons were detected.

EXAMPLE 7

Measurement of Oxygen Scavenging Capacity of Potassium-PSDVB Scavenger 2

The oxygen scavenging capacity of the K/Amberlite scavenger prepared in Example 3 was measured. A stream of 1% $O_2$ in $N_2$ at a flow rate of 100 sccm was passed through a 30 ml sample of the scavenger. Oxygen in the effluent stream was measured with a Model 100 Delta F Trace Oxygen Analyzer (Delta F Corp., Woburn, Mass.). The 1% $O_2$ flow was continued through the sample with no $O_2$ detectable in the effluent for about 50 minutes, whereupon $O_2$ breakthrough occurred. On this basis, the $O_2$ capacity of the scavenger was calculated to be 1.7 liters $O_2$ per liter of the K/Amberlite scavenger resin. The spent resin from this $O_2$ capacity test did not appear to undergo reaction upon exposure to room air. By contrast, unused K/Amberlite scavenger resin underwent a dark-brown to beige color change and a temperature rise of about 10° C. when exposed to room air.

EXAMPLE 8

Analysis of $C_1$–$C_4$ Hydrocarbon Emissions from Sodium/Potassium Alloy-PSDVB Scavenger The scavenger prepared in Example 4 was analyzed for $C_1$–$C_4$ hydrocarbon emissions by the method described in Example 6. No off-gassing of $C_1$–$C_4$ hydrocarbons was observed when the scavenger was purged with ultra-high purity helium (detection limit 10 ppb for each $C_1$–$C_4$ hydrocarbon component).

EXAMPLE 9

Measurement of Oxygen Scavenging Capacity of Sodium/Potassium Alloy-PSDVB Scavenger The oxygen scavenging capacity of the scavenger prepared in Example 4 was measured by the method described in Example 7. The $O_2$ scavenging capacity of the Na/K/Amberlite was 1.7 liters $O_2$ per liter scavenger bed.

EXAMPLE 10

Figure 3:
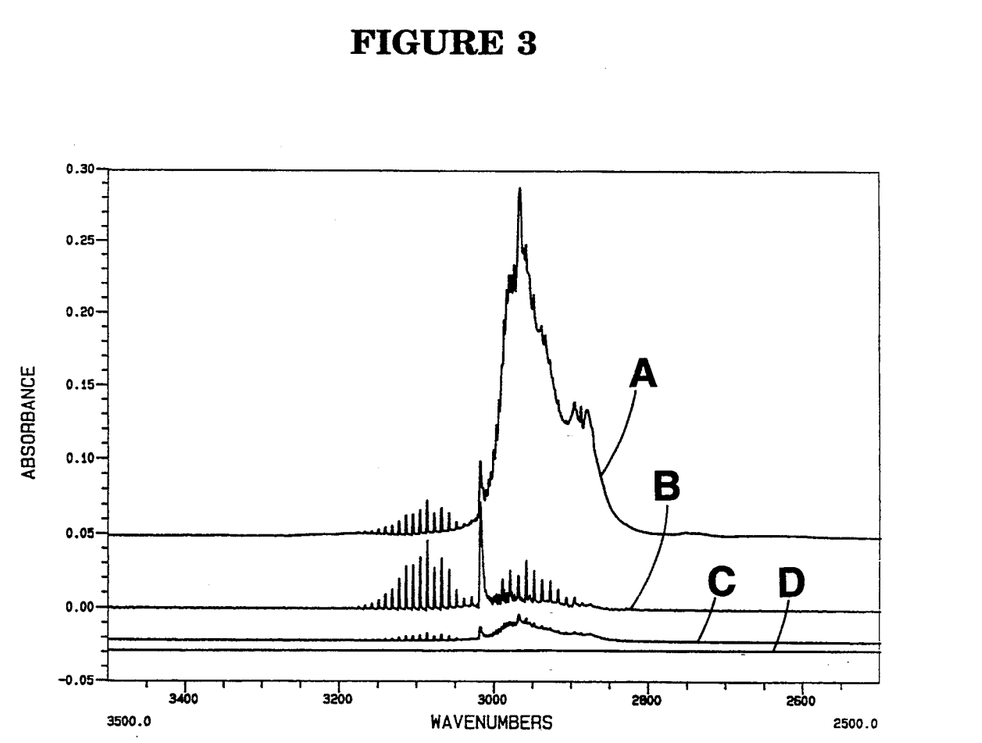
FIG. 3 shows the infrared absorbances of gases purged from the headspaces of a resin-based purifier according to U.S. Pat. No. 4,950,419 (Trace A), a commercially available resin-based purifier, the "Nanochem® Gas Purifier" (Semigas Systems, San Jose, Calif.) (Trace B), and a purifier according to the present invention (Trace D). Trace C shows the infrared absorbances of a gas standard mixture containing 1 ppm each of $C_1$–$C_4$ hydrocarbons (Matheson Gas Products, San Jose, Calif.).

Comparison of $C_1$–$C_4$ Hydrocarbon Emissions from Three Resin-Based Purifiers FIG. 3 shows the infrared absorbances of gases purged from the headspaces of a resin-based purifier according to U.S. Pat. No. 4,950,419 (Trace A), a commercially available resin-based purifier, the "Nanochem® Gas Purifier" (Semigas Systems, San Jose, Calif.) (Trace B), and a purifier according to the present invention (Trace D). Trace C shows the infrared absorbances of a gas standard mixture containing 1 ppm each of $C_1$–$C_4$ hydrocarbons (Matheson Gas Products, San Jose, Calif.). The hydrocarbon emissions from the three purifiers were compared by experiments performed as follows:

Trace A

A 150 ml sample of purifier resin prepared according to U.S. Pat. No. 4,950,419 was sealed off in a sample cylinder for about 8 weeks. A 500 sccm flow of highly pure helium was started through the purifier to a 10 meter path length infrared (IR) absorbance cell and thence to a gas chromatograph (GC) fitted with a discharge ionization detector. The GC column was a 50 meter alumina porous layer open tube capillary column of 0.53 mm inner diameter. The IR was the primary analytical tool and the GC was confirming. The frequency of the carbon-hydrogen stretching band (2970 cm$^{-1}$) was used because it is common to all hydrocarbons except methane, which was quantified separately. The detection limit for methane was about 30 ppb and for total hydrocarbons it was about 60 ppb. The GC detection limit was about 100 ppb for each hydrocarbon. After being valved off for 8 weeks, the purifier head space contained about 3.1 ppm total hydrocarbons and 8.9 ppm methane.

Trace B

A 300 ml purifier (Nanochem® Purifier, Ser. No. 6413) was valved off for 4 days. As was described for Trace A, a 500 sccm flow of highly pure helium was started through the purifier to a 10 meter path length infrared (IR) absorbance cell and thence to a gas chromatograph (GC) fitted with a discharge ionization detector. The GC column was a 50 meter alumina porous layer open tube capillary column of 0.53 mm inner diameter. After being valved off for 6 weeks, the purifier head space contained no detectable $C_1$–$C_4$ hydrocarbons.

Trace C

The IR analysis as described for Traces A and B was standardized with a mixture of 1 ppm each of $C_1$ through $C_4$ hydrocarbons (Matheson Gas Products, San Jose, Calif.).

Trace D

A 300 ml sample of purifier resin (1 mol K/liter Amberlite) was prepared as described in Example 3, heated to 210° C. for 30 hours, and then heated at 210° C. and purged with a 300 sccm flow of highly pure argon for an additional 100 hours, and then sealed off in a sample cylinder for about 6 weeks. As was described for Trace A, a 500 sccm flow of highly pure helium was started through the purifier to a 10 meter path length infrared (IR) absorbance cell and thence to a gas chromatograph (GC) fitted with a discharge ionization detector. The GC column was a 50 meter alumina porous layer open tube capillary column of 0.53 mm inner diameter. After being valved off for 6 weeks, the purifier head space contained no detectable $C_1$–$C_4$ hydrocarbons. Helium flowed through the purifier for 20 minutes at room temperature at 500 sccm with no change in hydrocarbon emissions.

Although the invention has been described with respect to particular features, aspects, and embodiments thereof, it will be apparent that numerous variations, modifications, and other embodiments are possible within the broad scope of the present invention, and accordingly, all variations, modifications, and embodiments are to be regarded as being within the spirit and scope of the invention.

What is claimed is:

1. A scavenger having utility for purifying a gaseous mixture comprising (i) a primary component selected from one or more members of the group consisting of hydrogen, nitrogen, noble gases, diborane and Group IVA–VIA hydride gases, and (ii) impurities selected from one or more members of the group consisting of Lewis acids and oxidants, said scavenger comprising:

an inert support having a surface area in the range of from about 50 to about 1000 square meters per gram, and thermally stable up to at least about 250° C.; and an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

2. A scavenger according to claim 1, wherein said support is a macroreticulate polymer formed from monomers selected from the group consisting of styrene, vinyltoluene, vinylisopropylbenzene, ethylvinylbenzene, vinylnaphthalene, alpha-methylstyrene, beta-methylstyrene, and mixtures thereof.

3. A scavenger according to claim 2, wherein the polymer has been formed by polymerization of said monomer in the presence of a cross-linking agent selected from the group consisting of divinylbenzene and divinylnaphthalene.

4. A scavenger according to claim 1, wherein said support is poly(styrenedivinylbenzene).

5. A scavenger according to claim 1, wherein the support has pores of a diameter in the range of from about 3 to about 200 Ångstroms, and is thermally stable up to about 250° C.

6. A scavenger according to claim 1, having a water removal capacity of from about 0.2 to about 20 liters gaseous water per liter of a bed of said scavenger.

7. A scavenger according to claim 1, having an oxygen removal capacity of from about 0.2 to about 20 liters gaseous water per liter of a bed of said scavenger.

8. A scavenger according to claim 1, wherein the Group IA metal is selected from the group consisting of sodium, potassium, and sodium-potassium alloys.

9. A scavenger according to claim 8, wherein the Group IA metal is present on the support at a concentration of from about 0.01 to about 0.25 moles per liter of support.

10. A scavenger according to claim 1 wherein said scavenger in said purification process produces an effluent gas stream having a concentration of less than 60 ppb $C_1$–$C_4$ hydrocarbons.

11. A method of making a scavenger having utility for purifying a gaseous mixture comprising (i) a primary component selected from one or more members of the group consisting of hydrogen, nitrogen, noble gases, diborane and Group IVA–VIA hydride gases, and (ii) impurities selected from one or more members of the group consisting of Lewis acids and oxidants, to remove said impurities therefrom, said method comprising:

providing a support having a surface area in the range of from about 50 to about 1000 square meters per gram, and thermally stable up to at least about 250° C.;

depositing on such support, at a concentration from about 0.01 to about 1.0 moles per liter of support, a Group IA metal selected from the group consisting of sodium, potassium, rubidium and cesium and mixtures and alloys thereof; and pyrolyzing the metal on the support, at a temperature of from about 125° C. to about 225° C. under sufficient conditions to distribute the alkali metal throughout the porous support.

12. A method as in claim 11, wherein during the step of pyrolyzing the metal on the support, the support is blanketed with an inert gas selected from the group consisting of argon, nitrogen, and helium.

13. A method according to claim 11, wherein the Group IA metal is deposited on the support in a concentration of from about 0.01 to about 0.25 moles per liter of support.

14. A method as in claim 11, wherein said sufficient conditions to distribute the alkali metal throughout the porous support comprise intermittent mixing.

15. A method as in claim 11, wherein said sufficient conditions to distribute the alkali metal throughout the porous support comprise continuous mixing.

* * * * *